United States Patent [19]

Joseph et al.

[11] Patent Number: 4,875,706

[45] Date of Patent: Oct. 24, 1989

[54] HYDROPNEUMATIC SUSPENSION UNIT FOR WHEELED VEHICLES, PARTICULARLY CROSS-COUNTRY VEHICLES

[75] Inventors: Philippe Joseph, Carpentras; Jean Michel Perrochat, Montrouge, both of France

[73] Assignee: S.A.M.M. - Societe d'Applications des Machines Motrices, Bievres, France

[21] Appl. No.: 240,297

[22] Filed: Sep. 6, 1988

[30] Foreign Application Priority Data

Sep. 10, 1987 [FR] France ............... 87 12567

[51] Int. Cl.$^4$ ............................. B60G 11/30
[52] U.S. Cl. .................... 280/708; 280/709
[58] Field of Search ............... 280/708, 709

[56] References Cited

U.S. PATENT DOCUMENTS

| | | | |
|---|---|---|---|
| 2,253,190 | 8/1941 | Mistral | 280/709 |
| 3,330,578 | 7/1967 | Kress et al. | 280/708 |
| 4,133,555 | 1/1979 | Henter, Jr. | 280/709 |
| 4,236,726 | 12/1980 | Henter, Jr. | 280/709 |
| 4,798,398 | 1/1989 | Cummins | 280/708 |

FOREIGN PATENT DOCUMENTS

| | | |
|---|---|---|
| 1555004 | 6/1970 | Fed. Rep. of Germany . |
| 2629518 | 1/1978 | Fed. Rep. of Germany . |
| 2582997 | 12/1986 | France . |
| 15983 | of 1913 | United Kingdom . |
| 480467 | 2/1938 | United Kingdom . |

*Primary Examiner*—Kenneth R. Rice
*Attorney, Agent, or Firm*—Sughrue, Mion, Zinn, Macpeak & Seas

[57] ABSTRACT

This unit is provided with two hydropneumatic jacks (2) having parallel vertical axes X—X and comprising bodies (5) adapted to be rigidly connected by a plate (3) and mounted slidably on rods (6) fixed to the chassis (7) of the vehicle. The plate (3) is sufficiently wide to allow if desired the passage of a transmission for the corresponding wheel. This arrangement improves the guiding of the wheels by holding them in fixed planes and enables them if desired to be made into driving and/or steered wheels.

5 Claims, 5 Drawing Sheets

HYDROPNEUMATIC SUSPENSION UNIT FOR WHEELED VEHICLES, PARTICULARLY CROSS-COUNTRY VEHICLES

BACKGROUND OF THE INVENTION

The present invention relates to a hydropneumatic suspension unit for wheeled vehicles, particularly off-road vehicles. Suspensions are known in which the wheel is carried by the body of a jack mounted slidably on a rod fixed to the chassis of the vehicle, and by a wishbone pivoted to the chassis and to the body of the jack, for example (MacPherson type suspension). With a suspension of this kind, and in fact with other known suspensions, the wheel associated with the suspension unit is also led, during its vertical oscillations, to turn on each side of this plane, so that the guidance of this wheel is inadequate. Furthermore, the size of the lower parts, particularly of the wishbone, limits ground clearance.

SUMMARY OF THE INVENTION

The principal aim of the invention is to overcome these drawbacks.

According to the invention, the hydropneumatic suspension unit is provided with two hydropneumatic jacks, each of which comprises a first member adapted to be fixed to the chassis of the vehicle and a second member slidably mounted on the first member, the two second sliding members being rigidly connected together and mechanically fastened to the corresponding wheel.

In one embodiment of the invention, in which each jack has a rod passing through a cylinder and containing a pneumatic accumulator, the two bodies are slidably mounted on the rods and are rigidly connected by a plate on which the wheel is mounted, the rods being fastened to the chassis.

In that case, the mechanical fastening of the wheel to the plate and the sliding bodies prevent any possibility of the wheel rocking on each side of the vertical plane in which it oscillates. The arrangement according to the invention therefore considerably improves the guidance of the vehicle wheels equipped with such suspension units and also the ground clearance because of the reduction of the dimensions of the bottom part of this suspension.

According to one particular feature of the invention the plate is of sufficient width and is bored to allow the passage of a transmission and/or a shaft for the steering of the wheel. This wheel can thus be made driving and/or steering wheel far more easily than wheels associated with suspensions of the type referred to above.

Other features and advantages of the invention will emerge during the description given below with reference to the attached drawings, which illustrate two examples thereof as non-limitative examples, and in which:

DETAILED DESCRIPTION OF PREFERRED EMBODIMENTS

Figure 1:
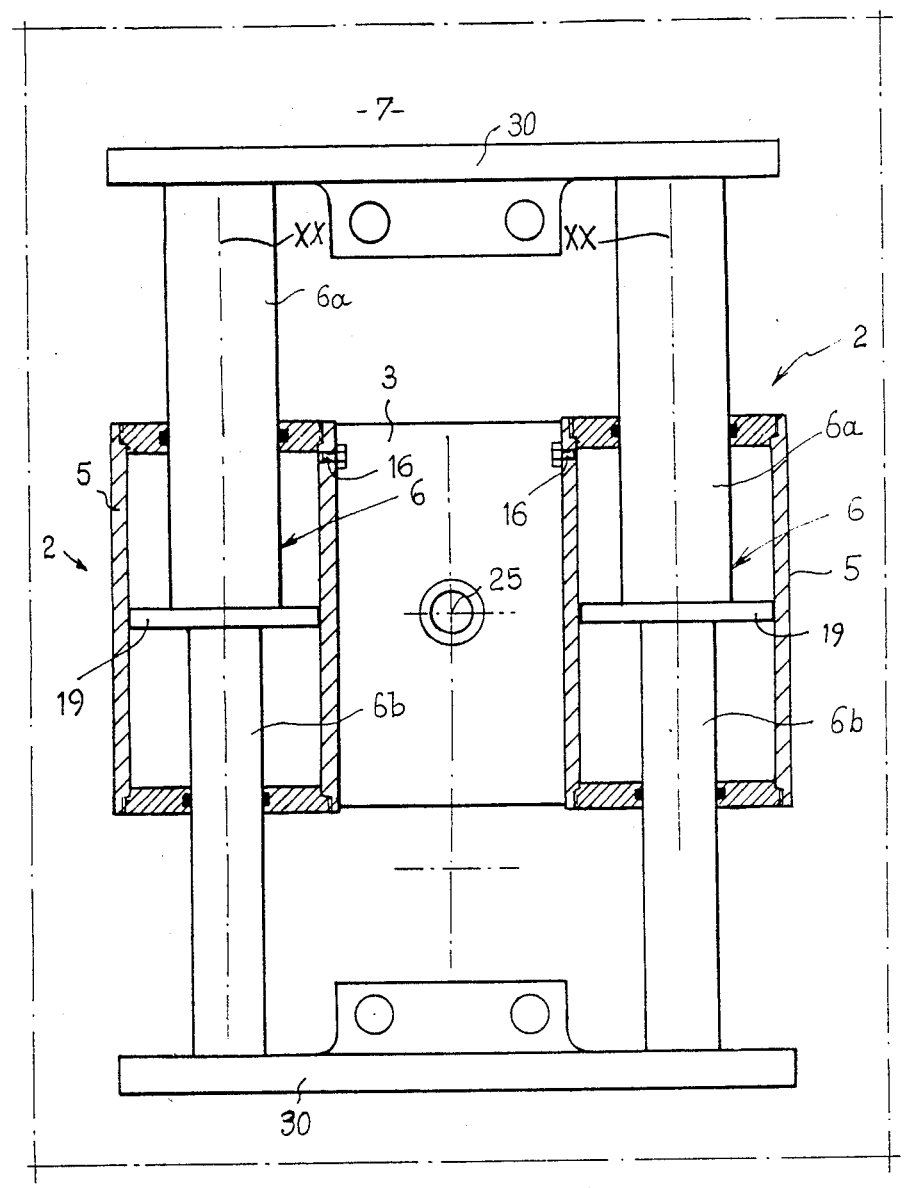
FIG. 1 is a side view in elevation of a first embodiment of construction of the hydropneumatic suspension unit according to the invention.

The suspension unit shown in the drawings comprises two hydropneumatic jacks each comprising a first member adapted to be fixed to the chassis 7 of the vehicle and a second member slidably mounted on said first member, the two second slidable members being rigidly connected together and mechanically fastened to the corresponding wheel 1.

Figure 2:
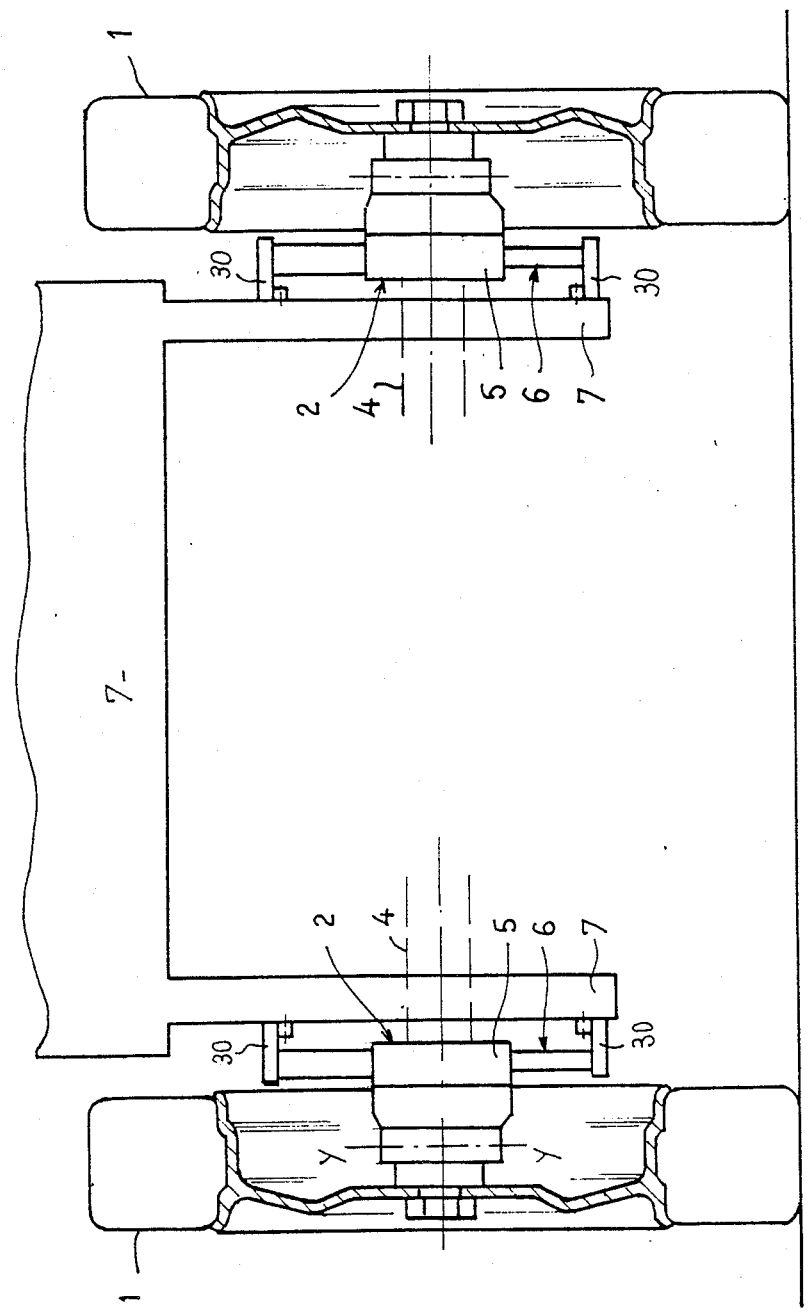
FIG. 2 is an end view in elevation of a vehicle equipped with suspension units according to FIG. 1.
Figure 3:
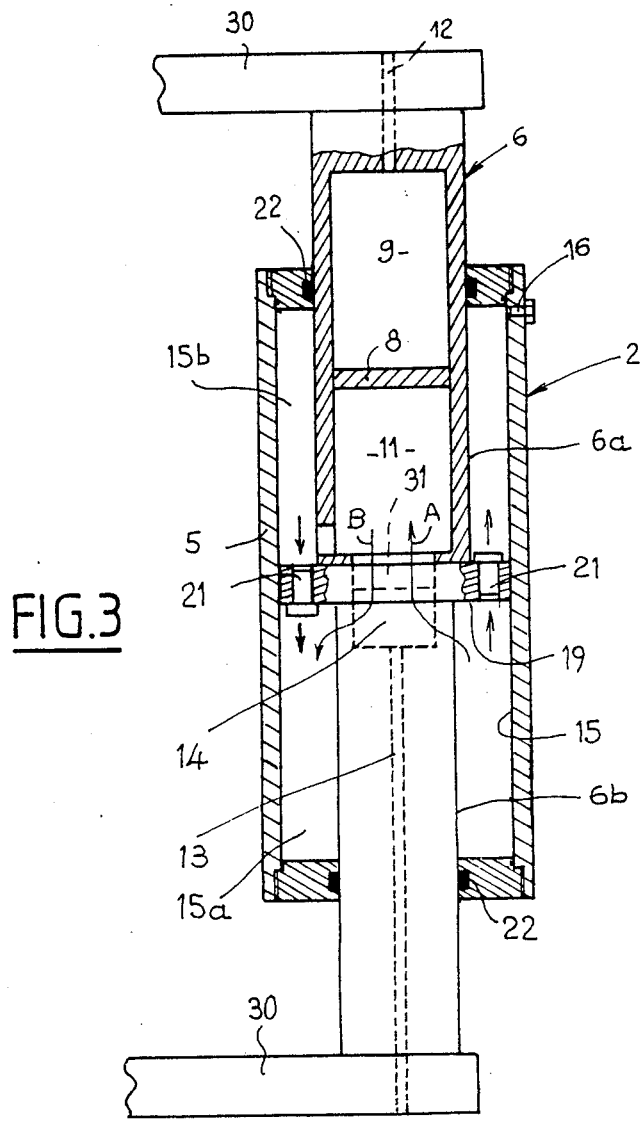
FIG. 3 is a view in vertical axial section of one of the hydropneumatic jacks of the suspension unit shown in FIGS. 1 and 2.

In the first embodiment shown in FIGS. 1 to 3, said first member of each jack 2 is a rod 6 having a vertical axis X—X and axially passing through a cylinder 5 constituting said second member, each cylinder 5 thus being slidably mounted on the associated rod 6. The two rods 6 are connected to their ends by braces 30 fixed to the chassis 7, for example by bolting. Each rod 6 is composed of two parts 6a, 6b having different diameters, the diameter of the upper part 6a having larger than that of the lower part 6b. Each upper part 6a is hollow and contains a longitudinal chamber divided by a freely sliding piston 8 into two compartments 9, 11, respectively filled with a gas and a hydraulic liquid (for example nitrogen and oil) forming a hydropnenuatic accumulator.

The compartment 9 can be filled with gas through a duct 12 formed in the end of the part 6a and in the brace 30. The oil compartment 11 can be filled with liquid through an axial duct 13 formed in the part 6b of the rod 6. A damper 31 and a clipping valve 14 are disposed in the rod 6 at the junction of the parts 6a and 6b, between the end of the duct 13 and the compartment 11. The liquid can circulate between the latter and an inner chamber 15 in the body 5, following the paths A and B schematically shown. The clipping valve 14 is constructed in a manner known per se, for example advantageously in accordance with French Patent Application 86 18 207 of the 26th December 1986 in the name of the Applicants. The damper 31 may also be constructed in known manner, for example in accordance with French Patent Application No. 86 18 208 of the 26th December 1986 in the name of the Applicants.

At the junction of the parts 6a and 6b the rod 6 is provided with a piston 19 through which the damper 31 and the clipping valve 14 pass.

Figure 7:
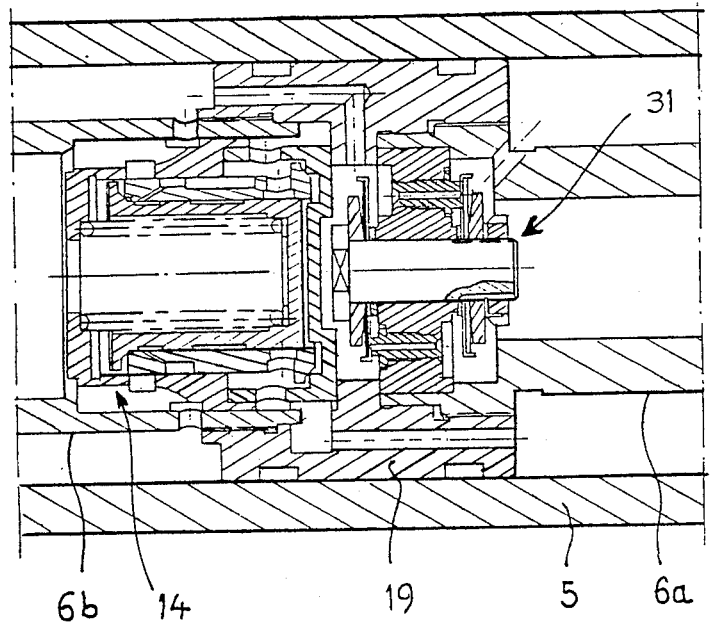
FIG. 7 is a view in axial section of an industrial embodiment corresponding to an embodiment of the jack shown in FIG. 3.

FIG. 7 shows an embodiment of the damper 31, of the valve 14 and of the oil circulation apertures in the piston 19 according to the two abovementioned patents. The contents of these patents are incorporated by reference to the present description, so that a detailed description of FIG. 7 is not necessary.

The end members of the body 5, which are attached by screwthreads, are bored with openings for the leak-tight passage of the rod 6 with the aid of seals 22.

Figure 6:
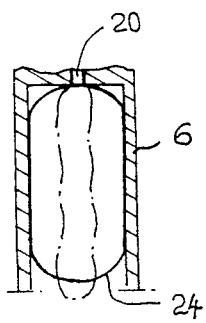
FIG. 6 is a detail view showing a variant of the accumulator of the hydropneumatic jack shown in FIG. 3.

As an alternative the piston 8 may be replaced with a bladder 24 (FIG. 6) provided with a valve 20. Similarly, instead of the damper 31 it is possible to use, for damping purposes, yet apertures 21 bored in the piston 19. In both cases the damping means permit the circulation of the oil between the compartments 15a and 15b of the chamber 15.

The plate 3 may have a central aperture 25 for the passage of a transmission 4, optionally with the addition of a steering shaft 4a. The wheel 1 can thus be adapted for driving and/or steering about the axis Y—Y; the steering shaft may be provided without the transmission. The body 5 may if necessary be provided with a heat transport tube for the evacuation of the heat produced by the oscillations of the suspension unit; this heat transport tube may for example be of the type described in French Patent 83 20 063 (No. 2 556 804) in the name of the Applicant.

Additional functions may be assigned to this suspension unit with the aid of external devices (not shown), the hydropneumatic liquid of which communicates with the member 2 either by way of the duct 13 or by way of an a drain aperture 16 formed in the wall of the body 5. It is thus possible to connect the member 2 to a ground clearance connector, such as for example that described in French Patent 85 05 064 of the 3rd April 1985 in the name of the Applicant.

The operation of the suspension member 2 is clear from the description given above: when a wheel 1 associated with a suspension member 2 passes over a bump or a depression in the ground, the assembly fastened to said wheel, consisting of the plate 3 and the body 5, slides on the rods 6 and the liquid passes from one of the compartments 15a and 15b to the other, either by way of the damping jet apertures 21 or by way of the damper 31 depending on the selected construction. The clipping valve 14 absorbs the fraction of liquid which cannot pass through the damper 31 or through the jet apertures 21. The spring action is provided by means of the variations of volume of liquid in the body 5 of the jack, which are due to the difference between the sections of the parts 6a and 6b of the rod 6, this variation of volume compressing or expanding the gas contained in the chamber 9.

The advantages of the suspension unit according to the invention are as follows: the mounting of the wheel 1 on the plate 3, which is fastened for vertical translation with the bodies 5, holds the wheel 1 in a fixed vertical plane of oscillation, preventing it from rocking on each side of said plane. The mounting according to the invention therefore ensures excellent guiding of the wheel.

Furthermore, unlike previously known suspension units, the suspension unit 2 can be placed close against the wheel 1, being practically integrated into it, thus freeing an appreciable volume under the chassis, whereby in particular ground clearance can be substantially improved. The invention also makes it possible to drive the wheel by passing the transmission 4 between the two jacks 2.

Figure 5:
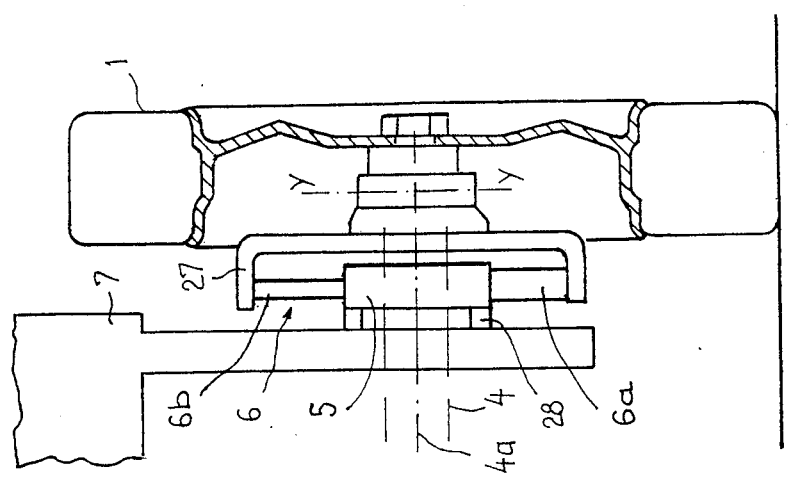
FIG. 5 is an end view in elevation of the suspension unit shown in FIG. 4, with the associated wheel, viewed in a direction at right angles the plane of said figure.
Figure 4:
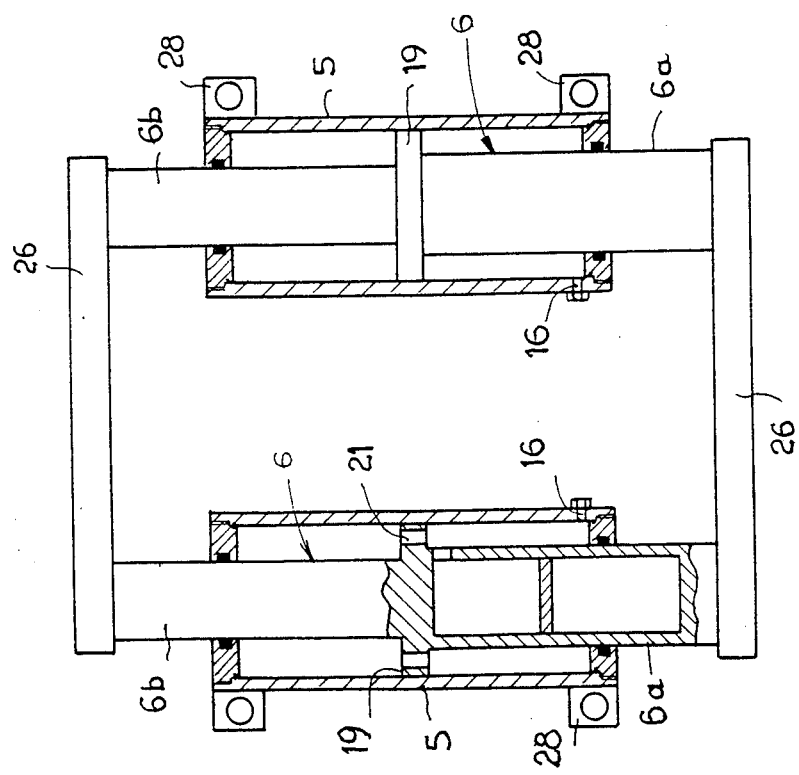
FIG. 4 is a similar view to FIG. 1, showing a second embodiment of the invention.

In the second embodiment, illustrated in FIGS. 4 and 5, the two cylinders 5 are fastened to the chassis 7, for example by lugs 28, and the two rods 6 are mounted for axial sliding in the cylinders 5, their opposite ends being rigidly connected by braces 26. The wheel 1 is fastened for vertical translation with the assembly comprising the two rods 6 and their connecting braces 26 by means of a member 27 whose ends are fixed to the braces 26. The wheel 1 may be associated with a transmission 4 passing between the two bodies 5, which are sufficiently spaced far apart for the purpose, and passing through the member 27. As in the previous embodiment, the wheel 1 may also be made steering.

The suspension unit shown in FIGS. 4 and 5 operates in the same way as that shown in FIGS. 1 and 3, and offers the same technical advantages.

As a variant, it is possible to extend the plate 3 downward over a certain height and to pivot the wheel on the bottom part of this plate, thus further increasing the ground clearance of the vehicle.

What is claimed is:

1. Hydropneumatic suspension unit for a wheeled vehicle, characterized in that: it comprises two hydropneumatic jacks (2) each being mounted on one side of an associated wheel (1) and forming a closed hydraulic circuit; each jack comprises a first member (6 or 5), adapted to be fixed to a chassis of the vehicle, and a second member (5 or 6) slidably mounted on the first member and having means at two opposite end portions thereof for guiding the sliding movement of said second member; and the two second sliding members (5 or 6) are rigidly connected together and mechanically fastened to the corresponding wheel (1).

2. Unit according to claim 1, characterized in that when each jack has a double rod (6) passing through both ends of a cylinder (5) and containing a hydropneumatic accumulator (9, 11), the two bodies (5) are slidably mounted on the rods (6) on which their end portions are slidably guided and are rigidly connected by a plate (3) on which the wheel (1) is mounted, the rods (6) being fastened to the chassis (7).

3. Unit according to claim 2, characterized in that the plate (3) has a sufficient width and is bored to allow the passage of a transmission (4) for the wheel (1).

4. Unit according to claim 1, characterized in that when each jack (2) has a double rod (6) passing through both ends of a cylinder (5) and containing a hydropneumatic accumulator (9, 11), the two cylinders (5) are fixed to the chassis (7) and the two rods are mounted slidably in the cylinders and slidably guided at the end portions of said cylinders and rigidly connected by their ends by means of braces (26).

5. Unit according to claim 4, characterized in that the bodies (5) are sufficiently far apart spaced to allow the passage between them of a transmission (4) for the wheel (1), which is mechanically connected to the two sliding rods (6).

* * * * *